United States Patent [19]

Harting et al.

[11] Patent Number: 4,634,206
[45] Date of Patent: Jan. 6, 1987

[54] APPARATUS FOR INSERTING A FLAT CABLE

[75] Inventors: Dietmar Harting, Espelkamp; Hans Nagel, Porta Westfalica; Günter Piewitt, Lübbecke, all of Fed. Rep. of Germany

[73] Assignee: Harting Elektronik GmbH, Espelkamp, Fed. Rep. of Germany

[21] Appl. No.: 772,595

[22] Filed: Sep. 4, 1985

[30] Foreign Application Priority Data

Sep. 19, 1984 [DE] Fed. Rep. of Germany ... 8427559[U]
Apr. 20, 1985 [DE] Fed. Rep. of Germany ... 8511822[U]

[51] Int. Cl.$^4$ .................................................. H01R 13/58
[52] U.S. Cl. ................................................. 339/103 M
[58] Field of Search .......... 339/103 R, 103 M, 103 B, 339/17 F, 176 MF, 94 A, 94 M; 174/65 SS

[56] References Cited

U.S. PATENT DOCUMENTS

| | | | |
|---|---|---|---|
| 2,963,536 | 12/1960 | Kokalas | 339/103 M X |
| 3,568,131 | 3/1971 | Kennedy | 339/176 MF |
| 4,451,099 | 5/1984 | Bricker | 339/103 M X |
| 4,537,458 | 8/1985 | Worth | 339/17 F X |

FOREIGN PATENT DOCUMENTS 125869  9/1947  Australia ......................... 339/103 B Primary Examiner—Eugene F. Desmond Attorney, Agent, or Firm—Jordan and Hamburg

[57] ABSTRACT

The invention refers to an apparatus for inserting a flat cable into a housing, which ensures safeguarding the cable or the cable connections on the inside of the housing against tensile stress. The apparatus is to a large extent adapted to the measurements of the flat cable (width/thickness) and also offers sufficient protection in preventing foreign material from entering into the inside of the housing.

For this purpose, the housing is provided with a frame-shaped mounting part (1, 102) which has posts (14, 106) arranged on opposite sides. In the bottom area of the mounting part there is provided a cable passage (23, 104) facing towards the inside space of the housing, and in the mounting part there is provided a groove (22, 103) with rim-side shoulders (10, 105) for an insertable, elastic seal (2, 110). The seal is provided with a passage opening (28, 122) corresponding to the shape of the cross-section of the flat cable (9, 109). By interfacing the flat cable, tensile stress relief clamps (4,5; 116,117) can be bolted together with the posts (14, 106) of the mounting part.

The mounting part can be embodied as a separate component which can be screwed in front of a wall opening or a housing opening, or it can also be embodied in one piece together with the housing, for instance, a connector housing.

24 Claims, 32 Drawing Figures

APPARATUS FOR INSERTING A FLAT CABLE

The invention refers to an apparatus for inserting a flat cable in wall openings, housing walls, etc., in particular for housings of connectors.

Cable entries have to be sufficiently protected against tensile stress of the cable in order to avoid, in a given case, that the cable will not be pulled out of the housing or the cable entry device, and that no insufficient tensile stresses occur at the locations of line connections.

Additionally, it also has to be assured that bending stresses do not cause cable damage.

Cable entries provided with tensile stress relief are generally known for round cables. For this purpose, the cable is fastened in a round passage slot utilizing an annular, elastic sealing element or clamping element by means of a so-called stuffing-box threaded coupling. A threaded component compresses the sealing element, whereby the inner diameter thereof is reduced and tightly pressed against the cable sheathing of the inserted cable. Thereby results, on the one hand, a tight hold of the cable in the cable entry, and on the other hand, also a seal against external influences, such as dust and humidity. However, such stuffing-box threaded couplings are unsuitable for flat cable because of the geometric dimensions of flat cables. The object of the invention is therefore to provide a cable entry for flat cable, which is extensively adapted to the dimensions of flat cable (width/thickness), which offers sufficient protection against intrusion of foreign materials, and which, with respect to tensile stress, offers safety for the cable, providing the inserted cable simultaneously also with protection against bending stresses.

According to the invention, the object is achieved whereby a frame-shaped mounting part is provided on which posts are arranged on opposite sides, and whereby in the bottom area of the mounting part there is provided a cable passage facing in the direction of the inner space of the housing; a groove with rim-side support shoulders for an insertable, elastic seal is provided in the mounting part; the seal is provided with an opening corresponding to the shape of the cross-section of the flat cable; with interposition of the flat cable, the tensile stress relief clamps can be bolted together with the posts of the mounting part.

Further characteristics and advantageous embodiments of the invention are indicated in the claims.

The advantages of the invention consist especially in that an entry of a flat cable is provided with a tensile stress relief and a simultaneous seal, which is extensively adapted to the cross-sectional shape of the flat cable and has a minimum extension in the transversal direction of the cross-section of the flat cable. The cable entry is thereby especially advantageous for use on small, rectangular connector housings or general housings.

In particular, such cable entries can be used for such circuit plugs/cable connections of movable instruments, such as, for instance, traveling carriages or the like, whereby during operative use, there occur constant movement shifts.

According to one embodiment of the invention it is possible that in an apparatus for cable entry, there is inserted not only one single flat cable, but also several, parallel guided, "stacked-up" flat cables.

Another embodiment is especially advantageous with respect to manufacturing and storage costs, because it can be used with a uniform cable entry for all possible cable configurations or any number of cables. The uniform cable entry is provided with a correspondingly large cable passage opening. The adaptation to the particular used cable configurations can be made by means of variously shaped economical seals in combination with pressure disks.

Several embodiments of the invention are shown in the drawings and will be more closely explained below.

BRIEF DESCRIPTION OF THE DRAWINGS

FIGS. 15A and 15B are views of the pressure disk of the embodiment of FIGS. 12 and 13, and FIGS. 16A, 16B, and 16C are views of the pressure plate of the embodiment of FIGS. 12 and 13.

DESCRIPTION OF THE PREFERRED EMBODIMENTS

Figure 1:
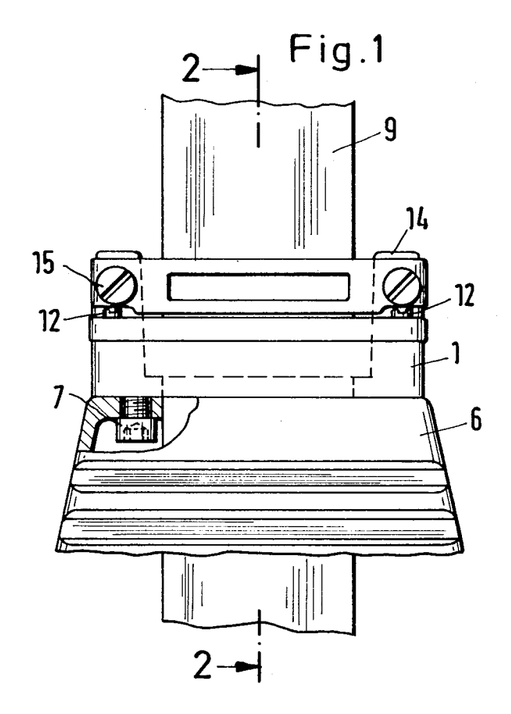
FIG. 1 is a view of a flat cable entry on a connector housing in which the latter is a separate component.
Figure 2:
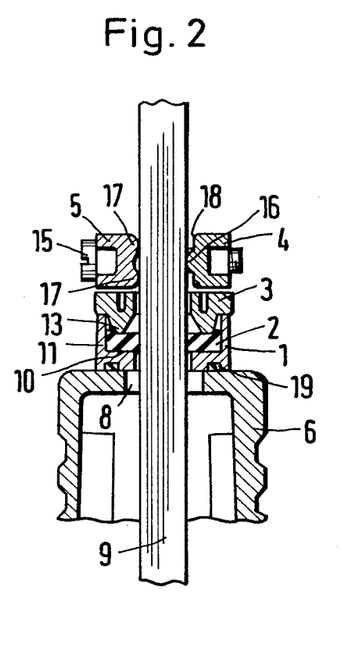
FIG. 2 is a view of the flat cable entry according to FIG. 1 taken along the line 2—2 in FIG. 1.

The flat cable entry with tensile stress relief shown in FIGS. 1 and 2 essentially consists of a frame-shaped mounting part 1, a seal 2, a pressure plate 3, and pressure stress relief clamps 4 and 5.

The mounting part is arranged on a connector housing 6 having an opening 8 through which the flat cable 9 is inserted and is fastened by bolts 7.

An elastic seal 2 is inserted into the mounting part 1, whereby the seal makes contact with contact shoulders 10 provided on the floor of the mounting part. The seal is laterally enclosed by lateral parts 11 of the mounting part and tightly encloses the flat cable. The pressure plate 3 is arranged over the seal. The pressure plate 3 is bolted to the mounting part by bolts 12. The surrounding roll-shaped rim 13 of the pressure plate is pressed against the seal.

The mounting part 1 is furthermore provided with two perpendicular, lateral posts 14, to which the tensile stress relief clamps 4, 5 are fastened. For this purpose, one of the two clamps is provided with tap holes, and the posts and the other clamp is respectively provided with openings for bolts 15. When the two clamps are bolted together, the flat cable 9 is clamped between them and held safely in place. In order to attain a good clamping action, the clamp 4 is provided with a rib 16 extending in a transversal direction to the cable, and the clamp 5 is provided with two stress ribs 17. Appropriate roundings on the ribs prevent cable damage, whereby the externally facing edges 18 of the clamps, which face towards the outgoing cable, are also provided with roundings in order to prevent cable damage when the cable is bent.

The assembly of the cable entry is performed in the following way:

Firstly, the mounting part 1 is bolted to the connector housing 6, whereby an enclosing groove 24 can be provided on the bottom side of the mounting part, in which groove a sealing ring 19 is inserted for sealing the inside space of the housing against foreign materials and humidity. Subsequently, the seal 2 is inserted into the mounting part and the flat cable 9 is guided through the opening 28 of the seal. The pressure plate 3, which is previously slipped over the flat cable, is then bolted to the mounting part. The roll-shaped rim 13 of the pressure plate presses thereby against the seal, which cannot give way towards the outside because of the enclosing lateral part 11 of the mounting part, and thus has a tendency to give way towards the inside, in the direction of the cable. Thus, the seal is tightly pressed against all sides of the flat cable. At the location of the cable entry, there thus results a troubleproof seal against the entry of foreign materials or humidity.

Subsequently the tensile stress clamps 4, 5 are placed in position and are threaded head-to-head. The flat cable guided between the clamps is thereby tightly clamped and held safely in place, whereby the clamps are simultaneously tightly connected to the posts of the mounting part. The flat cable entry produced in this way, on the one hand, effects a troublefree relief of tensile stress for the inserted flat cable, and on the other hand, provides a sufficient seal for the inside space of the housing against the penetration of soil, such as dust, humidity, etc.

The utilization of the flat cable entry according to the invention is possible on all flat housings or wall surfaces. In case of extensive deviations of the flat cable measurements (width/thickness), it is provided that correspondingly varying openings (adapted to the individual utilized cables), seals and pressure plates are used. It can also be provided that two, or in a given case, also many flat cables are entered superposed into the cable entry, whereby, in this case, adapted seals and pressure plates are also used, whereby likewise a sealing of the entry location is attained in that the seal is pressed against the outer cable, and that the cables are pressed against each other. For flat cable entries without any special requirements with respect to sealing the inside space of the housing, i.e., where only sealing against larger soil particles, but not against humidity, is required, it can be provided, that the pressure plate is omitted and that the seal's thickness is such that it extends somewhat over the lateral parts 11 of the mounting part. However, in that case, the tensile stress relief clamps have to be configured such that their undersides press against the seal when threaded to the posts of the mounting part. The undersides of the clamps can thereby additionally be provided with a cleat-shaped extension which is similar to the roll-shaped rim of the pressure plate.

In order to facilitate better understanding of the embodiment of the various elements of the flat cable entry and their interactions. FIGS. 3 to 8 separately illustrate the elements which will be briefly explained below.

Figure 3A:
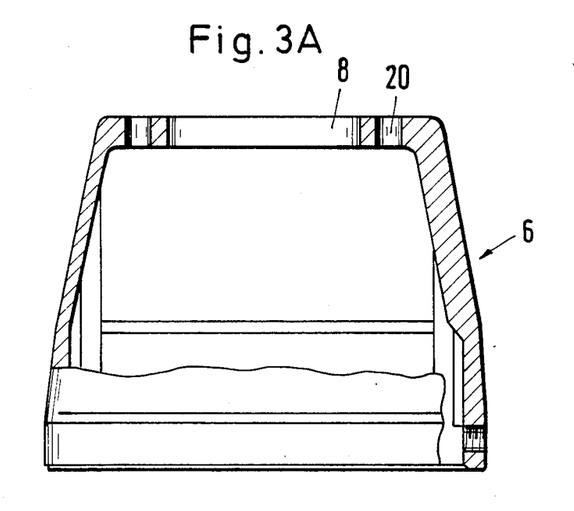
FIGS. 3A and 3B are views of the connector housing taken before the flat cable entry is installed.
Figure 3B:
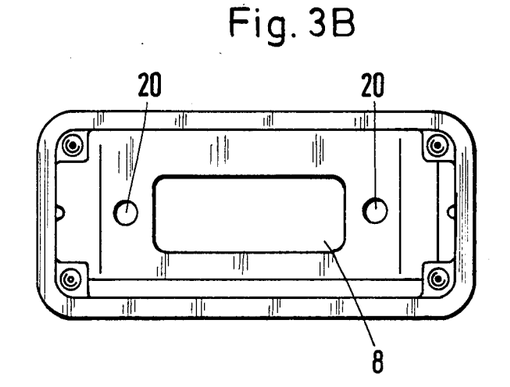
Figure 4A:
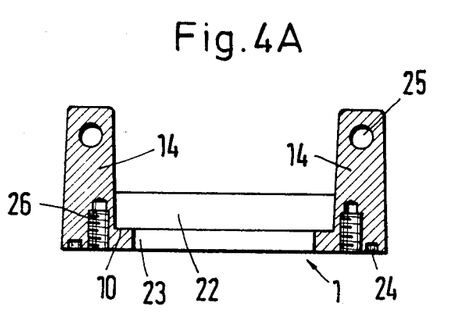
FIGS. 4A, 4B, 4C, and 4D are views of the frame-shaped mounting part.
Figure 4B:
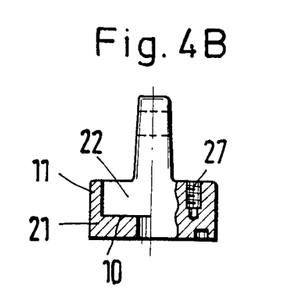
Figure 4C:
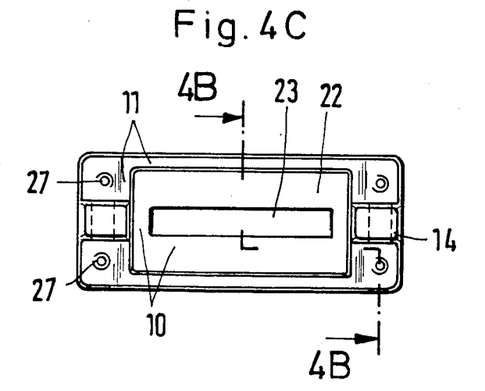
Figure 4D:
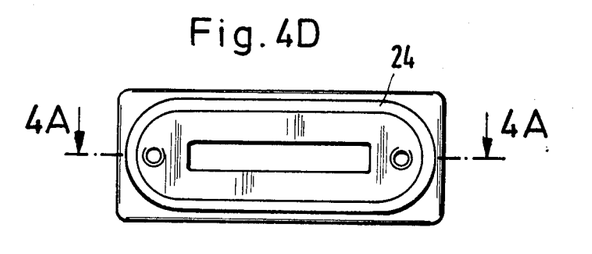

FIG. 3 shows the connector housing 6 provided on its upper side with the rectangular passage opening 8 for the flat cable which is to be inserted. Next to the opening, there are provided passage openings 20 for the bolt fastening of the mounting part 1. The rest of the connector housing corresponds to a housing known in normal commercial usage, in which a connector insert (not shown in detail) can be inserted from the direction of the bottom side.

FIG. 4 shows various views of a mounting part 1. The mounting part essentially consists of a frame-shaped base part 21 which is provided with two posts 14 on the two opposite sides. The base part is thereby provided with a rectangular groove 22, thereby forming the lateral parts 11 of the mounting part. At the bottom of the groove is a rectangular opening 23 through which the flat cable is guided. This opening is smaller than the inside width of the groove 22, in order to thereby form the contact shoulders 10 for the seal 2 which is to be inserted later. On the underside of the mounting part is molded an enclosing groove 24 into which, as described above, the sealing ring 19 can be inserted. The upper areas of the posts 14 are provided with bore holes 25 which serve for fastening the tensile stress relief clamps 4, 5.

Tap holes 26 are provided for the fastening to the connector housing 6 or a wall surface.

Tap holes 27 provided in the upper side of the mounting frame serve for fastening the pressure plate 3.

Figure 5A:
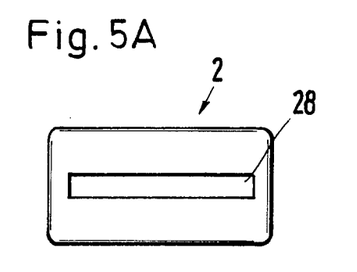
FIGS. 5A and 5B are views of the seal.
Figure 5B:
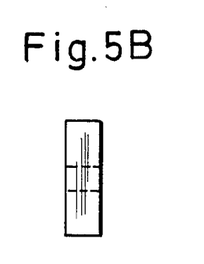

The seal 2 is shown in FIG. 5. The seal is made of an elastic material, preferably foam rubber. The outer measurements thereof correspond to the measurements of the groove 22 of the mounting part, and the thickness of the seal corresponds approximately to the depth of this groove. The thickness is at least so great, that there is enough sealing material available during compression by the pressure plate, so that the sealing material can "flow" in the transversal direction of the seal. Furthermore, the seal is provided with a centered rectangular opening 28, whereof the width (length/width) is adapted to the utilized flat cable.

Figure 6A:
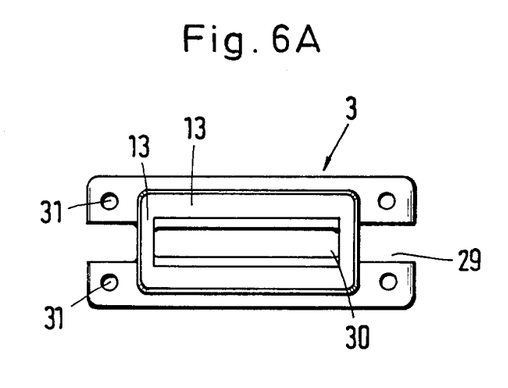
FIGS. 6A, 6B, and 6C are views of the pressure plate.
Figure 6B:
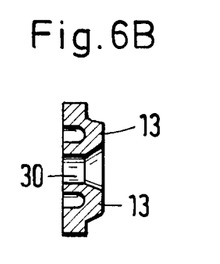
Figure 6C:
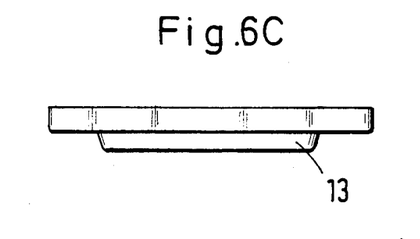

FIG. 6 shows the embodiment of the pressure plate 3. Essentially, the pressure plate is a flat, rectangular plate, adapted to the shape (with respect to the outer measurements) of the mounting part. The lateral slits 29 are provided for receiving the posts 14 of the mounting part. The pressure plate is provided with a rectangular opening 30, which is also adapted to the flat cable to be inserted. The opening is surrounded by an enclosing, roll-shaped rim 13, which presses against the seal 2 when the cable entry is joined together. Bores 31 are provided for the fastening to the mounting part.

Figure 7A:
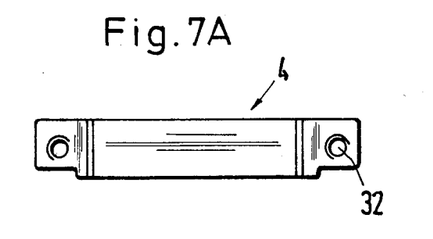
FIGS. 7A, 7B, and 7C are views of one of the tensile stress relief clamps.
Figure 7B:
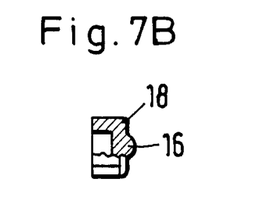
Figure 7C:
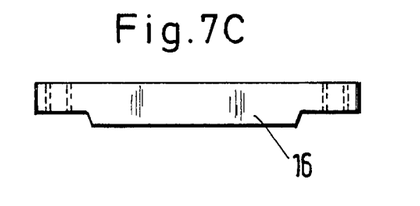
Figures 8A, 8B:
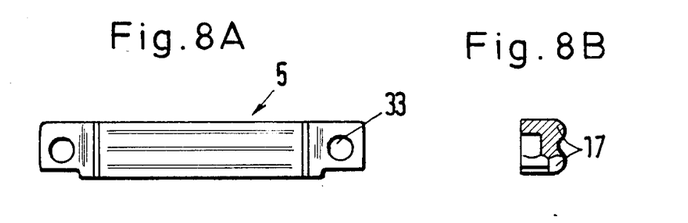
FIGS. 8A, 8B, and 8C are views of the other tensile stress relief clamp.
Figure 8C:
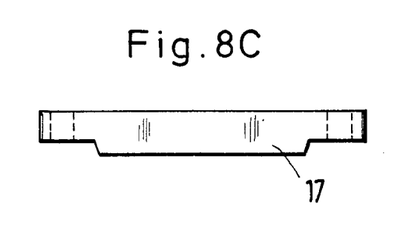

Finally, FIGS. 7 and 8 show the embodiment of the tensile stress relief clamps 4 and 5. As already mentioned above, when the flat cable is interposed, these clamps are bolted together head-to-head.

In order to obtain an optimum clamping, the bending-resistant clamp 4 is provided with a transversely extending rib 16, whereas the clamp 5, which is also bending-resistant, has two ribs 17 at a distance from each other.

At the ends, the clamps are provided with bores 32, 33 for head-to-head bolting under inclusion of the posts 14 of the mounting part, whereby in one of the clamps, there are provided bolt holes 33 and tapholes 32 in the other clamp.

The edges of the ribs and the edges of the clamps which come into contact with the cable are rounded in order to prevent cable damage.

Of course, it can also be provided that one of the two clamps is made in one piece together with the post 14 of the mounting part 1.

Figure 9:
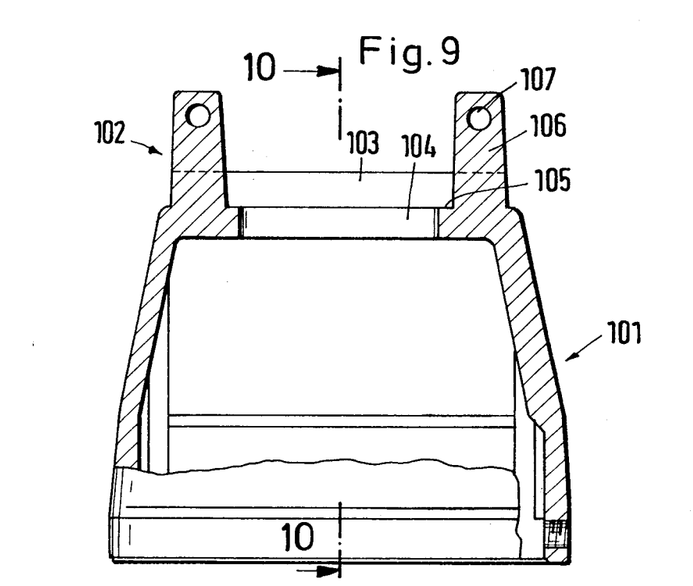
FIG. 9 is an alternate view of a connector housing with a mounting part integrally formed therewith as one piece.
Figure 10:
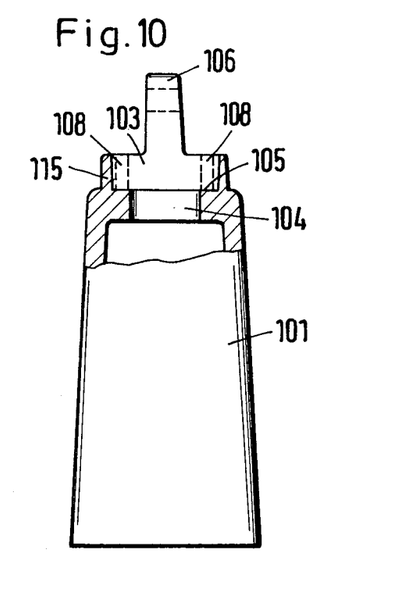
FIG. 10 is a side view of FIG. 9.
Figure 11:
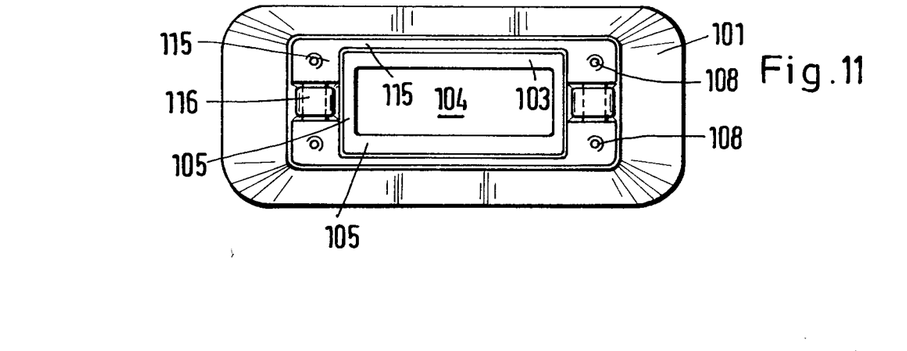
FIG. 11 is a view from the top of FIG. 9.

In FIGS. 9 to 11 are shown various views of an alterate connector housing 101. On the upper side of the housing is provided a frame-shaped mounting part 102 which is made in one piece with the housing. The housing with the mounting part is made of metal or plastic material, and is preferably manufactured by means of an injection molding process. An essentially rectangular recess 103 is molded into the mounting part, and in the bottom area of the recess 103 is provided a rectangular passage opening 104 which leads to the inside space of the housing. The measurements of this passage opening are smaller than the recess 103, so that it forms borderside enclosing shoulders 105. On two opposite sides of the mounting part are provided perpendicular posts 106 on which the tensile stress relief clamps, which will be described below, can be fastened. For this purpose, the posts have corresponding bores 107. Furthermore, in the mounting part, there are provided taphole bores 108 which serve for fastening a pressure plate, which is provided in a given case, and which will also be described in greater detail below. On the housing side facing the mounting part, a connector insert can be mounted in the housing, which is not shown in detail.

Figure 12:
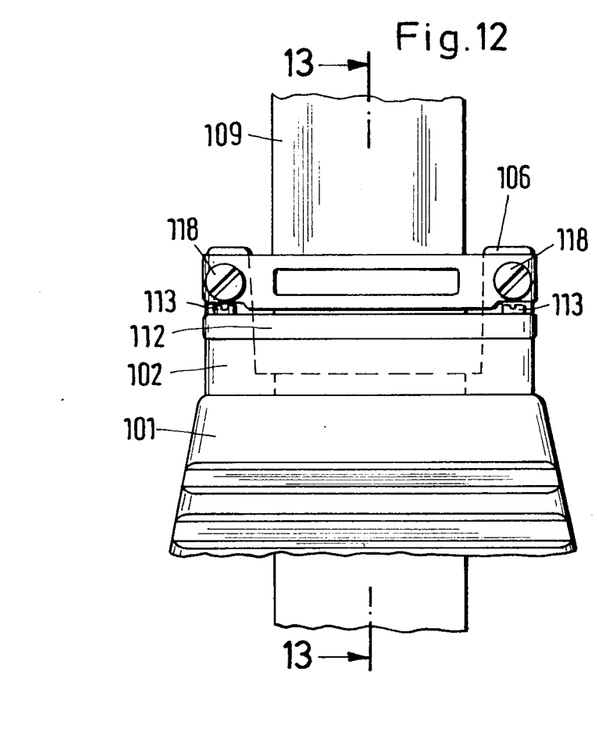
FIG. 12 is a view of the completely installed flat cable entry for a connector housing corresponding to FIGS. 9-11.
Figure 13:
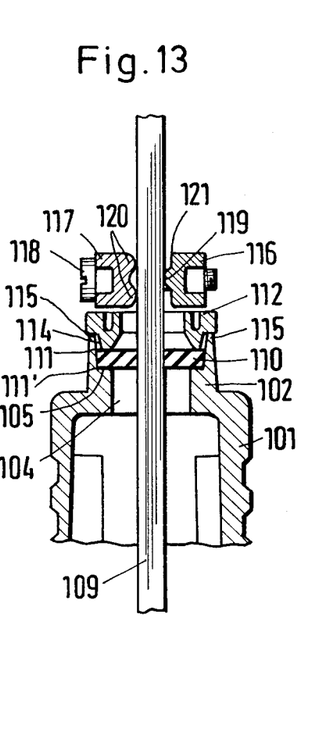
FIG. 13 is a view of the flat cable entry taken along line 13—13 in FIG. 12.

The following refers to FIGS. 12 and 13, which show how a flat cable 109 is inserted into the housing 101 and held in place so that it is free of tensile stress. In the recess 103 of the mounting part 102 is inserted a seal 110 which is made of elastic material, such as soft rubber, foam rubber or the like. The seal corresponds in its outer measurements to the dimensions of the recess 103, and is provided with a rectangular center slit 122 corresponding to the cross-sectional shape of the flat cable. On the top side and on the bottom side of the seal are arranged respective pressure disks 111, 111' made of bending-resistant material (such as, for instance, steel plate). The outer measurements of these disks correspond to the geometry of the recess 103 of the mounting part. The disks are provided with a centered opening corresponding to the cross-sectional dimensions of the inserted flat cable 109. The flat cable is guided through the slit 122 of the seal, as well as the opening 128 of the disks and extends through the passage opening 104 into the inside of the housing. Furthermore, a pressure plate 112 is pushed over the cable and bolted to the mounting part via the bolts 113, which are threaded into the bores 108. An enclosing roll-shaped rim 114 of the pressure plate presses thereby on the upper disk 111 which compresses the seal. By means of the lateral parts 115 of the mounting part, which laterally/outwardly enclose the seal, the seal cannot escape toward the outside and thus has a tendency of escaping towards the inside in the direction of the cable. The seal is thereby on all sides tightly pressed against the flat cable. The bottom disk 111' makes thereby contact with the edges (shoulders 105) of the mounting part, with the effect, that the elastic seal does not get pressed through the preferably larger (for the insertion of several parallel flat cables) passage opening 104. In total, such an assembly of the cable entry provides a troublefree seal as protection against entry of foreign materials as well as humidity.

Furthermore, there are provided two tensile stress relief clamps 116, 117, which are bolted with the posts 106 of the mounting part after the flat cable is interposed. For this purpose, one of the two clamps is provided with tapholes, and the posts and the other clamps are each provided with bolt holes for the bolts 118. When the two clamps are bolted together, the flat cable is clamped between the two clamps and is safely held in position.

In order to attain a good clamping action, the clamp 116 is provided with a rib 119 extending transversely to the cable, and the clamp 117 has two ribs 120 at a distance from each other. When the two clamps are bolted head-to-head, the rib 119 of the clamp 116 thereby extends in the direction of the center between the two ribs 120 of the clamp 117.

Appropriate roundings on the ribs prevent the cable from getting damaged, whereby the edges 121 of the clamps, which extend toward the outside in the direction of the outgoing cable, are also provided with roundings in order to prevent damaging the cable when the cable is bent.

The flat cable entry according to the invention is not only intended for use in connector housings which are manufactured for individual specific cable dimensions, and whereby passage openings 104 in the mounting part are used corresponding to the cross-section of the cable, as well as various seals and pressure plates provided with slits and pressure plates of appropriate sizes. However, housings of this kind, which are adapted to the particular cross-section of the cable, do not need to be provided with the pressure disks 111, 111', because it is thereby possible to attain a problemfree seal even without these disks.

Figure 13A:
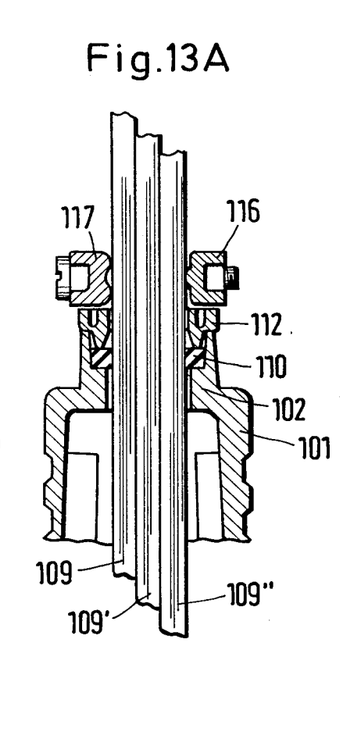
FIG. 13A is a view similar to FIG. 13 for a flat cable entry having three flat cables.

For a universal application of the connector housing, it is preferably provided that, as shown in FIGS. 9-13, the opening 104 in the mounting part/housing is so large, that the maximum intended number of flat cables can be inserted superposed on each other. A corresponding embodiment is shown in FIG. 13A, wherein is shown the insertion and holding of three flat cables 109, 109', 109''. By the utilization of the housing with the flat cable entry opening 104 for the maximum number of flat cables, it is possible to omit the insertion of pressure disks, because even without these disks, the seal can not escape here and a troublefree seal of the cable entry is attained, whereby the flat superposed cables are tightly pressed against each other. For a smaller number of cables, if necessary, also for cables of a smaller width, the pressure disks 111, 111' are inserted as mentioned above, and even in this case, it is thereby possible to attain a troublefree seal. The advantage of the embodiment lies thereby in the utilization of a standard integral housing, whereby the adaptation to the various number of cables or dimensions thereof is provided by economical pressure disks and seals which only have various openings 128.

For flat cable entries, whereby sealing the inner space of the housing does not present any particular problems, i.e., where only a sealing against larger soil particles needs to be provided, however not a seal against humidity, it can be provided to omit the pressure plate and to make the dimensions of the seal of such an extent that the seal extends somewhat over the lateral parts 115 of the mounting part. The tensile stress relief clamps, in this case, are configured such that during bolting with the posts of the mounting part, the undersides of the clamps press against the seal. The undersides of the clamps can additionally be provided with a cleat-shaped extension, similar to the roll-shaped rim of the pressure plate. In order to facilitate better understanding of the embodiment of the seal 110, pressure disks 111, 111', as well as pressure plate 112 and their interactions, wherein the here provided tensile stress relief clamps 116 and 117 are of the same embodiment as in FIGS. 7 and 8, these elements are separately shown in FIGS. 14 to 16 and will be briefly explained below.

Figure 14A:
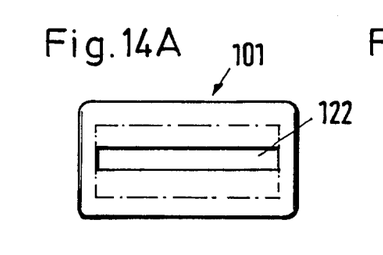
FIGS. 14A and 14B are views of the seal of the embodiment of FIGS. 12 and 13.
Figure 14B:
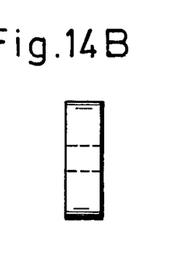

FIGS. 14A and 14B show a seal 110. The seal is made of an elastic material, preferably soft rubber. The external dimensions thereof correspond to the dimensions of the recess 103 of the mounting part and the thickness of the seal corresponds approximately to the depth of the recess. The seal is at least of such thickness so that when it is compressed by the pressure plate, there is enough sealing material available that it can "flow" in the transversal direction of the seal. Furthermore, the seal is provided with a centered, rectangular opening (slit 122), and the width (length/width) thereof corresponds to the utilized flat cable, if necessary, it can extend up to the size indicated by the dot-dash line.

Figure 15A:
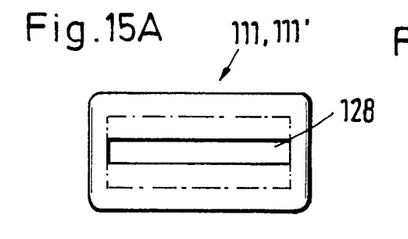
Figures 15B, 16B:
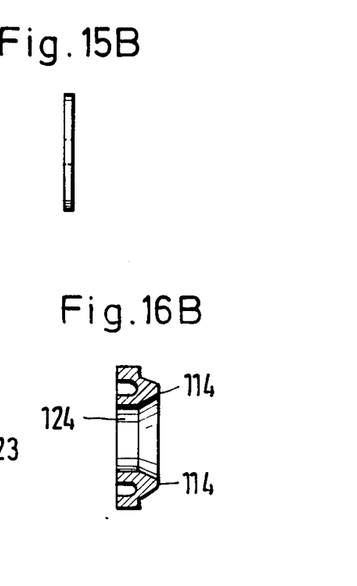

In the FIGS. 15A and 15B is shown an embodiment of a pressure disk 111, 111', which essentially corresponds to the shape of the seal shown in FIGS. 14A, 14B. However, it is thinner and is made of bending-resistant material.

Figure 16A:
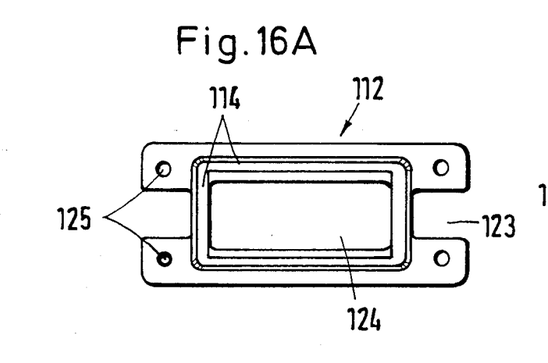
Figure 16C:
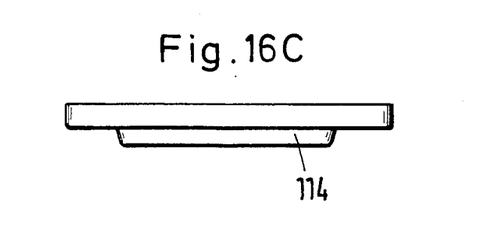

The FIGS. 16A, 16B and 16C show the embodiment of the pressure plate 112. The pressure plate is essentially a flat rectangular plate, whereby the shape (in reference to the external dimensions) is adapted to the mounting part, whereby lateral slits 123 are provided for receiving the posts 106 of the mounting part. The pressure plate is provided with a rectangular opening 124, which is also adapted to the flat cable to be inserted. The opening is surrounded by an enclosing, ring-shaped rim 114, which presses against the seal 110 or disk 111 when the cable entry is joined together. Bores 125 are provided for the fastening with the mounting part.

As already mentioned above, this embodiment also utilizes tensile stress relief clamps, which are configured and arranged according to those of the first embodiment described to FIGS. 7 and 8.

We claim:

1. Apparatus for securing a flat cable means into an opening in a connector housing, comprising a mounting-part means having an opening through which said flat cable means passes, said mounting-part means and said connector housing being integrally formed as one part, said mounting part means having posts on opposite sides of said opening, said mounting-part means having a rim-shoulder-groove disposed about said opening, a resilient seal means disposed in said rim shoulder-groove, said resilient seal means having an opening with a configuration corresponding generally to the cross sectional configuration of said flat cable means, and stress-relief clamp means secured to said posts and disposed above said flat cable means to engage and secure said flat cable means as said resilient seal means effects a seal about said flat cable means.

2. Apparatus according to claim 1, wherein said connector housing has a passage through which said flat cable means passes, said passage being generally aligned with said opening in said mounting-part means.

3. Apparatus according to claim 1, wherein said opening in said mounting-part means has a configuration corresponding to the cross section configuration of said flat cable means, said opening in said resilient seal means having a configuration corresponding to the cross section configuration of said opening in said mounting-part means.

4. Apparatus according to claim 1, wherein said flat cable means comprises a single cable element.

5. Apparatus according to claim 1, wherein said flat cable means comprises a plurality of cable elements superimposed on one another.

6. Apparatus for securing a flat cable means into an opening in a structure, comprising a mounting-part means having an opening through which said flat cable means passes, said mounting part means having posts on opposite sides of said opening, said mounting-part means having a rim shoulder-groove disposed about said opening, a resilient seal means disposed in said rim shoulder-groove, said resilient seal means having an opening with a configuration corresponding generally to the cross sectional configuration of said flat cable means, said stress-relief clamp means secured to said posts and disposed above said flat cable means to engage and secure said flat cable means as said resilient seal means effects a seal about said flat cable means, said stress-relief clamp means comprising two clamp members and fastening means for fastening said two clamp members to each other and to said posts.

7. Apparatus according to claim 6, wherein said structure is a connector housing, said connector housing and said mounting-part means being separate parts, and fastening means fastening said mounting-part means to said connector housing.

8. Apparatus according to claim 7, further comprising sealing ring means providing a seal between said mounting-part means and said connector housing, said sealing ring means encircling said flat cable means.

9. Apparatus according to claim 6, wherein at least one of said clamp members has a rounded rib portion extending generally transversely of the longitudinal extent of said flat cable means and which engages said flat cable means.

10. Apparatus according to claim 9, wherein the other of said clamp members has two rounded rib portions extending generally transversely of the longitudinal extent of said flat cable means, said two rounded rib portions being spaced from one another, said rounded rib portion of said one clamp member being disposed between said two spaced rib portions on said other clamp member when said two clamp members are clampingly fastened by said fastening means about said flat cable means.

11. Apparatus according to claim 6, wherein said flat cable means comprises a single cable element.

12. Apparatus according to claim 6, wherein said flat cable means comprises a plurality of cable elements superimposed on one another.

13. Apparatus for securing a flat cable means into an opening in a structure, comprising a mounting-part means having an opening through which said flat cable means passes, said mounting-part means having posts on opposite sides of said opening, said mounting part means having a rim shoulder-groove disposed about said opening, a resilient seal means disposed in said rim shoulder-groove, said resilient seal means having an opening with a configuration corresponding generally to the cross sectional configuration of said flat cable means, stress-relief clamp means secured to said posts and disposed above said flat cable means to engage and secure said flat cable means as said resilient seal means effects a seal about said flat cable means, pressure plate means having a cable passage through which said flat cable means passes, said pressure plate means being disposed juxtaposed to said resilient seal means and having a protruding part engaging said resilient seal means, and pressure plate fastening means for fastening said pressure plate means to said mounting-part means such that said protruding part applies pressure against said resilient seal means.

14. Apparatus according to claim 13, wherein said rim shoulder-groove has an outer wall, said resilient seal means comprising a resilient member having an outer edge with a configuration corresponding generally to the configuration of said outer wall such that said outer wall precludes said resilient member from expanding outwardly as said pressure plate means applies pressure against said resilient seal means, whereby said resilient member tends to expand inwardly against said flat cable means.

15. Apparatus according to claim 13, wherein said structure is a connector housing, said connector housing and said mounting-part means being separate parts, and fastening means fastening said mounting-part means to said connector housing.

16. Apparatus according to claim 15 further comprising sealing ring means providing a seal between said mounting-part means and said connector housing, said sealing ring means encircling said flat cable means.

17. Apparatus according to claim 13, wherein said flat cable means comprises a single cable element.

18. Apparatus according to claim 13, wherein said flat cable means comprises a plurality of cable elements superimposed on one another.

19. Apparatus for securing a flat cable means into an opening in a structure, comprising a mounting-part means having an opening through wich said flat cable means passes, said mounting-part means having posts on opposite sides of said opening, said mounting-part means having a rim shoulder-groove disposed about said opening, a resilient seal means disposed in said rim shoulder-groove, said resilient seal means having an opening with a configuration corresponding generally to the cross-sectional configuration of said flat cable means, a bending-resistant pressure disk provided on at least one side of said resilient seal means, said disk having an opening having a configuration corresponding to the configuration of said opening in said resilient seal means, and stress-relief clamp means secured to said posts and disposed above said flat cable means to engage and secure said flat cable means as said resilient seal means effects a seal about said flat cable means.

20. Apparatus according to claim 19, wherein there are two of said disks with one disk being disposed on one side of said resilient seal means and the other disk being on an opposite side of said resilient seal means.

21. Apparatus according to claim 19, wherein said structure is a connector housing, said connector housing and said mounting-part means being separate parts, and fastening means fastening said mounting-part means to said connector housing.

22. Apparatus according to claim 21 further comprising sealing ring means providing a seal between said mounting-part means and said connector housing, said sealing ring means encircling said flat cable means.

23. Apparatus according to claim 19, wherein said flat cable means comprises a single cable element.

24. Apparatus according to claim 19, wherein said flat cable means comprises a plurality of cable elements superimposed on one another.

* * * * *